(12) United States Patent
Little et al.

(10) Patent No.: US 6,317,493 B1
(45) Date of Patent: *Nov. 13, 2001

(54) AUTOMATED SYSTEM AND METHOD FOR SUBSCRIBER LINE SERVICE CONTROL

(75) Inventors: David M. Little, Columbia, MD (US); Wendell N. Sims, Woodford, VA (US); Darryl J. Wilson, Clinton, MD (US)

(73) Assignee: Bell Atlantic Network Services, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/138,407

(22) Filed: Aug. 24, 1998

Related U.S. Application Data (63) Continuation-in-part of application No. 09/138,408, filed on Aug. 24, 1998, now Pat. No. 6,035,029.

(51) Int. Cl.[7] ............................................. H04M 3/42
(52) U.S. Cl. ......................... 379/207; 379/201; 379/114
(58) Field of Search ..................................... 379/112, 113, 379/114, 201, 207

(56) References Cited

U.S. PATENT DOCUMENTS

| | | |
|---|---|---|
| 5,200,993 | 4/1993 | Wheeler et al. . |
| 5,247,347 | 9/1993 | Litteral et al. . |
| 5,528,281 | 6/1996 | Grady et al. . |
| 6,118,777 * | 9/2000 | Sylvain .......................... 370/395 X |

* cited by examiner

*Primary Examiner*—Creighton Smith (57) ABSTRACT

A signal band width limiter is provided in a telecommunication path that includes a leased unbundled subscriber line. The limiter may be a programmable active filter such as a digital signal processor in which filter characteristics are set under control of a controller at a central office. The controller may acquire the necessary subscriber level information via a data network from a data base at a remote location. Band pass ranges are set to frequencies corresponding to subscribed services. As the subscribed service is changed, replacement by the appropriate passband filter readily can be made. The telecommunication path can be monitored to determine whether an upgrade of service is required. Parameters of subscriber line leased from an ILEC by a CLEC can be tested at the ILEC premises.

20 Claims, 6 Drawing Sheets

AUTOMATED SYSTEM AND METHOD FOR SUBSCRIBER LINE SERVICE CONTROL

CROSS-REFERENCE TO RELATED APPLICATIONS

This is a continuation-in-part application of application Ser. No. 09/138,408, filed Aug. 24, 1998, now U.S. Pat. No. 6,035,029.

TECHNICAL FIELD

The present invention relates to telecommunications, more particularly to automated ILEC control of the level of service delivered over lines provided for CLEC service providers.

BACKGROUND OF THE INVENTION

Recent legislative and regulatory changes have been made to spur a more open service provider environment in the telecommunications industry. Subscription to local telephone service, open to competition, no longer will be limited to incumbent local exchange carriers (ILECs) such as the regional Bell Operating companies.

One aspect of this open environment policy pertains to competing local exchange carriers (CLECs) that are facility based, e.g., those competing carriers that have their own independent switching facilities. These facilities must be integrated into the public switched telephone network (PSTN) in a seamless manner from the user's perspective. The concept of user telephone number portability is basic to this end. In general, number portability refers to the ability of end users to retain their geographic or non-geographic telephone number when they change their service provider, their location, or their service. A wide application of number portability, for example, would permit a user to keep the same telephone number at the same or different location, while terminating service from one provider in favor of a new service provider, and moving from plain old telephone service (POTS) to integrated digital services network (ISDN). The Federal Communications Commission has proposed standards for local number portability (LNP) that relates to the ability of a telephone service subscriber to select or change the selection of a carrier for providing that customer's local telephone service, while still maintaining the subscriber's telephone number at the same customer premises.

Figure 1:
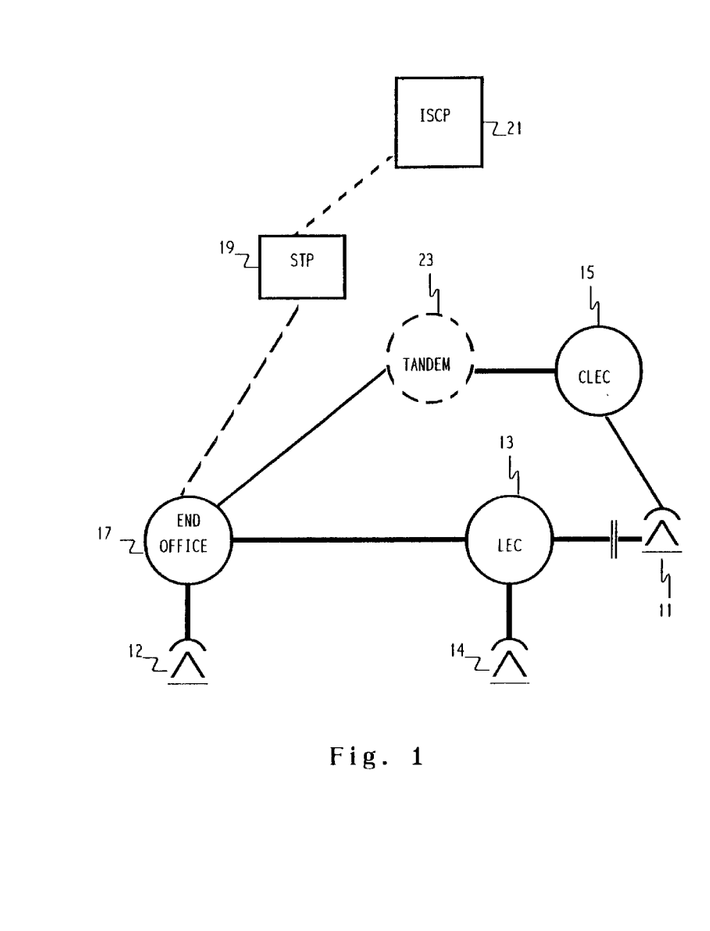
FIG. 1 is a simplified diagram exemplifying a public switched telephone network in which switching facilities of both an incumbent local exchange carrier and a competing local exchange carrier are available for direct loop connection to the subscriber.

FIG. 1 is a simplified diagram exemplifying a public switched telephone network in which switching facilities of both an incumbent local exchange carrier and a competing local exchange carrier are available for direct loop connection to the subscriber. A customer having telephone or like communication equipment at station 11 may obtain local exchange telephone service from either an original ILEC served by its end office 13, or a CLEC having an end office 15. The CLEC end office 15 may connect through trunk circuits to each ILEC end office in the area of service or to a trunk connection with an access tandem 23. Although not shown, the CLEC end office 15 also would connect into the common channel interoffice signaling network, at least for the exchange of call-setup related signaling messages. In the illustrated example, the subscriber at station 11, who originally received service through the ILEC has now selected the CLEC in replacement thereof for local service. Accordingly, the station 11 is shown connected to the CLEC end office 15, the previous subscriber loop connection to ILEC end office 13 having been disabled. Signaling Transfer Point (STP) 19 and Integrated Service Control Point (ISCP) are components of the known Advanced Intelligent Network (AIN) within which at least part of the common channeling signaling network is included. Various approaches have been undertaken to provide number portability for an arrangement such as this example that are not directly relevant to the present invention.

Another aspect of the open environment policy is embodied in a requirement that an ILEC unbundle certain network elements and services and offer use of those elements and services to other carriers, CLECs who may have remotely located switches but do not have facilities for direct local connection, for resale to end users. The ILEC, for example, must make available for sale to another carrier an unbundled port on an end office switch. The other carrier can then become a competing local exchange carrier by reselling services of the switch to end users having local loops that connect to the end office switch. The statutory and regulatory changes also require that customized routing be available for both unbundled switching and for resale. Customized routing is the term used in the regulations for routing calls made in the ILEC switch to locations other than normal routing locations.

Telephone service capability, of course, has extended beyond the POTS voice and ISDN communication of decades ago. With the advent of digital communications, the variety of telecommunication services and number of specialized service providers have increased at a remarkable pace. The availability of information in the form of data from various sources has spurred large public demand for broadband data transfer that challenges the capabilities of communication delivery systems. The number of information sources publicly and interactively available via the internet to personal computers, as well as private data network sources, continues to proliferate. Full motion video programming and source material also has rapidly progressed from early television broadcasting and cable distribution networks to a wide variety of distribution arrangements, including direct broadcast satellite television. The number of full motion video sources has expanded in response to increased usage and user demand for a greater range of subject matter content.

To meet user requirements, more robust broadband networks have evolved. For example, U.S. Pat. No. 5,247,347 to Litteral et al., discloses a digital video distribution network providing subscribers with access to multiple Video On Demand service providers through the public switched telephone network. The subscriber may transmit ordering information via the public switched telephone network to the independent video information providers. Video programming may be accessed and transmitted to the subscriber directly from a video information provider (VIP) or through a video buffer located at a central office (CO) serving the subscriber. Connectivity between the central office and the subscriber for transmission of video data is provided by an asymmetrical digital subscriber line (ADSL) system. ADSL, which has been standardized by ANSI as T1.413, uses existing unshielded twisted pair copper wires from the telephone company central office to the subscriber's premises. Equipment at the central office and the subscriber's premises permits transfer of more high speed digital information signals to the subscriber than in the reverse direction. The standard is directed to carrying video (broadband) to the home while returning control signals from the home at 16 Kbps.

In the Litteral et al. patent, ADSL interface units at the central office multiplex digital video information with voice information to be transmitted to the subscriber and support two-way transmission between the subscriber's line and the X.25 packet data network of one or more control channels. A subscriber may use either a standard telephone instrument over the public switched telephone network or a dedicated control device over an ISDN packet network to order video programming. The request is transmitted to a designated video information provider and digital transmission connectivity is established between the video information provider and the central office serving the subscriber. Connectivity between the central office and subscriber is provided by asymmetrical digital subscriber line interface units over a local loop. The interface units frequency multiplex digital video information with voice information to the subscriber and support transmission of a reverse transmission channel from the subscriber to the central office for transmission on the ISDN packet data network back to the video information provider. The interfaces also allow baseband signaling and audio between the central office and the subscriber for conventional telephone instrument connectivity. A complimentary ADSL interface unit at the subscriber's premises separates downstream video control signals and voice telephone signals from the line and multiplexes upstream control signals and voice telephone signals onto the line. A similar public switched telephone network multimedia information ADSL delivery system is disclosed, for example, in U.S. Pat. No. 5,528,281 to Grady et al.

ADSL offers a wide range of other applications, such as in education, health care, work-at-home access to corporate LANS and interactive services. HDSL has more recently evolved to provide T-1 capability on a normal twisted pair. Implementation may include various bit rates in either direction.

U.S. Pat. No. 5,200,993, issued Apr. 6, 1993 to Wheeler et al., describes a public telephone network distributed imaging system having enhanced capabilities. The distributed imaging system provides centralized image processing to end users and access to a range of image management capabilities residing on a shared platform distributed through a switched telephone system. The shared platform functions as a service bureau in delivering such capabilities to end users.

The distributed imaging system embodies an image platform based on the client-server model with standard communications interfaces to service multiple separate user groups accessing different applications. User groups can supply applications programs which are stored and run on the central hardware in support of respective user requirements. The image server operations are provided as functional primitives. User applications are provided by combining the primitives in a control script.

The provision of myriad services, such as those exemplified above, places a challenge on the ILEC to appropriately correlate usage of its subscribers with the various services offered so that dependable service can be provided and billing accounted therefor. With access to the final link to the subscriber available to CLECs, this challenge is further complicated. An end user may subscribe to various services through a CLEC of its choice, while provision of these subscribed services is conveyed through the plant of an ILEC. The ILEC must be able to determine whether the usage comports with its available capabilities and be able to apply the appropriate billing rates to usage that exceed the standard POTS charges. To further complicate this functionality, services may be distributed among several LECs. For example, the ILEC may continue to provide POTS service to a particular subscriber, while data services may be obtained from a different provider.

Commonly assigned co-pending applications Ser. Nos. 08/598,768 and 08/598,772 to Montgomery et. al., both filed Feb. 9, 1996, are directed to utilizing portions of the existing public switched telephone network for alternate purposes, while efficiently and conveniently providing a method of measuring the usage of such circuits for billing purposes. One or more telephone company local loops to subscriber premises may be utilized in whole or in part for providing to such premises a connection to the service platform of a third party alternate service provider. The alternate service provider may be another local telephone company, an interexchange carrier, a video service provider, a multi-media service provider, or the like. The use of the local loop is leased to the third party service provider at a rate dependent upon the usage and nature of usage of the circuit. Information and data to permit efficient and convenient billing for leased usage of such loops is implemented by providing on the local loop a passive monitor. The monitor detects and temporarily stores data relating to the commencement and termination of signaling, the time of day, and the nature of the signaling that occurs. Thus, charges may be dependent not only upon the time duration of signaling, but also on the rate of information transferred. Data collected from the monitors is stored at a monitor center from which it is transferred to a billing operation such as the telephone company Revenue Accounting Office (RAO). The arrangements of these applications are reactive in nature, from the standpoint that communication activity is observed and accounted for so that appropriate billing and any other accounting functionalities can be accurately provided.

The need remains for the ability, proactively, to determine that appropriate service will be provided to subscribers. In the current telephone system it is difficult to determine what kind of transmission is occurring on a particular pair of wires at any given time without physically accessing the wires and measuring activity. With the current system, the ILEC, who unbundles transmission pairs to be used by CLEC customers, cannot realistically sell to the CLEC separate classes of service and be assured that a subscriber to POTS will receive only POTS service and not a higher rated service, for example, ADSL. As ADSL continues to evolve, higher data rates have become available in different classes of ADSL service offerings. Usage higher than that for which the line is subscribed not only would cost the ILEC the difference in billing for over the subscribed class of service, but also may exceed the planned transmission capacities of the ILEC plant.

A related problem exists if an unbundled line is leased to a data services provider for use only for data communication, such as ADSL. The end user would retain POTS service subscription from the ILEC through the separate original line in addition to the newly acquired data service through the leased line. The ILEC should be able to maintain control over the leased line to limit use to the subscribed level of data communication. It would be highly desirable for such control to be maintained on an automated basis with a minimum of human interaction.

SUMMARY OF THE INVENTION

The present invention overcomes the aforementioned problems. An advantage of the present invention is that a LEC provider can automatically limit service of a POTS subscriber to POTS only, regardless of whether the subscriber terminating link is provided by a different local exchange carrier.

An additional advantage of the present invention is that an ILEC provider can proactively limit the communication services offered over unbundled lines leased to CLECs to within prescribed signal frequency transmissions.

A further advantage of the present invention is that changes in the limitations placed on leased unbundled lines can readily be made as service offerings change. Provisioning such changes can be made in an automated fashion with a minimum of human intervention.

These and other advantages are satisfied, at least in part, by the provision of a signal band width limiter in the communication path that includes the leased unbundled subscriber line. The signal limiter may be a low pass frequency filter having a band pass range set to the frequencies corresponding to the subscribed services. Thus, if only POTS service is offered, the filter has a passband range for passing only telephone service signals in a POTS analog frequency range. For ISDN service, the filter has a passband range for passing only telephone service signals within a frequency range prescribed for ISDN. For higher speed data services, such as HDSL and ADSL, filters with appropriate pass bands, up to complete pass through, are provided in the subscriber communication path. As the subscribed service is changed, replacement by the appropriate passband filter readily can be made.

The signal limiter may be located at the central office of the ILEC, such as at the main distribution frame. The CLEC may have ADSL facilities collocated with the ILEC central office. With such an arrangement, the CLEC can provide ADSL service and POTS service over the same loop or the CLEC, or other provider, can provide ADSL service to a subscriber over an unbundled ADSL loop while POTS service is provided the same subscriber over a separate POTS loop. If an unbundled loop is leased solely for a particular level of data communication service while the original POTS line remains under subscription to the ILEC, a band pass filter with the appropriate frequency range is inserted in the leased line communication path.

The ILEC central office may be equipped to provide fiber lines to remote locations such as controlled environmental vaults (CEVs) from which twisted pair may then be run to the subscriber premises. The signal limiters can be connected to distribution frames at such remote locations in lieu of central office main distribution frame connection.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

Figure 2:
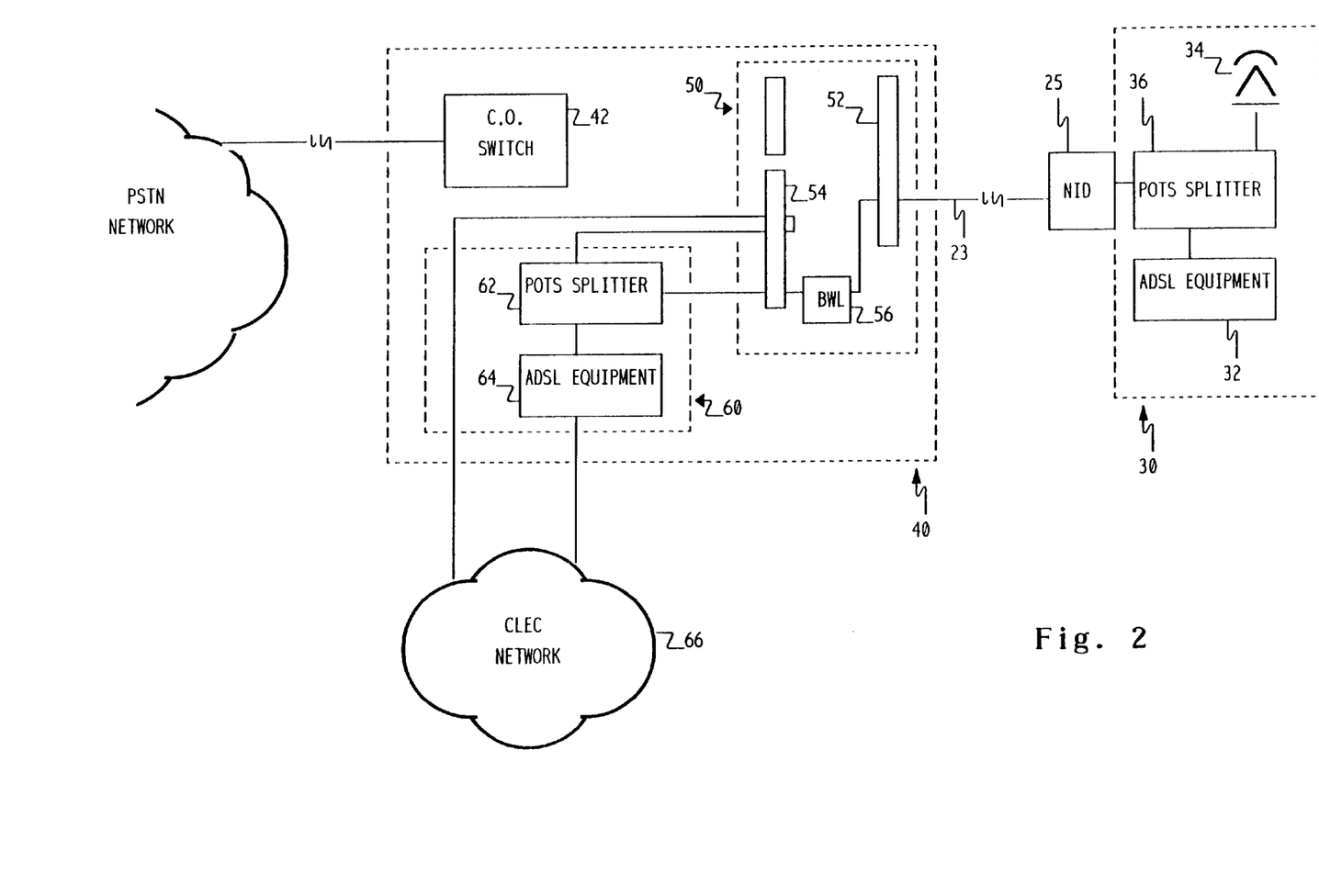
FIG. 2 is a simplified diagram of an embodiment of the present invention in which a user's only subscriber line can be leased to a competing service carrier capable of providing both POTS service and ADSL service over the same loop.

FIG. 2 is one example of an embodiment of the present invention in which an unbundled subscriber loop 23, serving customer premises 30, is leased by a competing provider from the local exchange carrier. The customer may have high speed data equipment 32, such as a computer with ADSL capability or the like, as well as standard telephony stations diagrammatically shown as telephone set 34. Access to the subscriber at the customer premises may be made through a conventional network interface device (NID) 25. POTS splitter 36, which also may be any of many conventional devices, splits analog signals for POTS communication with set 34 from the data communication delivered to equipment 32. The splitter also combines analog and data signals transmitted from the subscriber premises.

The subscriber loop is connected to distribution frame 52 of main distribution frame 50, located at the LEC central office 40. Also located at the central office are the central office switch 42 and CLEC equipment 60, comprising POTS splitter and ADSL equipment 64. The ADSL equipment, shown diagrammatically in block form at customer premises 30 and in the central office may comprise well known elements such as described, for example, in the aforementioned Litteral et al. patent. The central office switch interconnects with the public switched telephone network in conventional manner. The central office contains many other conventional elements, those which are not necessary for explanation of the current invention being deleted from the drawing for simplicity of illustration. CLEC equipment 60 is connected to frame 54 of the main distribution frame 50, as well as to its own network 66. Network 66 may comprise, in whole or in part, elements of other communication networks. While shown collocated at the LEC central office, equipment 60 may be located at a location remote from the central office 40. It is to be understood that FIG. 2 is merely illustrative and represents, for simplicity, only one subscriber and one alternate provider of many that may be served through the LEC office.

Connected between frames 52 and 54 is band width limiter 56 in a communication path that includes the subscriber line 23 and POTS splitter 62. The band width limiter serves to block signals in this path having frequencies outside the range that corresponds to subscribed services. The POTS splitter combines incoming analog POTS signals and data signals from the CLEC network that are received from different paths. Incoming POTS signals are received through the upper portion of frame 54. High speed data signals are received through the exemplary ADSL equipment 64. The combined signals are applied from the POTS splitter through the lower portion of frame 54 to the band width limiter. Outgoing signals from the subscriber line 23 travel a path through the band width limiter, lower portion of frame 54 and the POTS splitter, whereupon the signals are split for transmission of POTS signals through the upper frame portion path and the data signals through the ADSL equipment and back to the CLEC network.

The band width limiter 56 may comprise any well known filter or frequency attenuator that limits the transmission of signals within the prescribed frequency pass band range. In its simplest form, low pass filters such as RLC circuits can be used. The upper range limit of the particular filter to be used can be fixed by an appropriate filter circuit that correlates with the subscribed service. Filter circuits having various frequency pass ranges for the respective services can be supplied as plug-in units for easy installation at the main distribution frame.

Figures 3A, 3B, 3C:
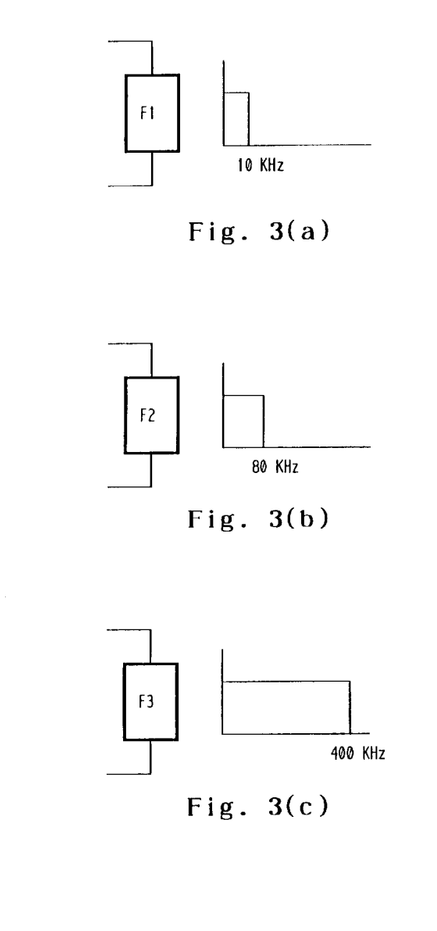
FIGS. 3(a)–3(c) are illustrations of plug-in band width limiters which may be used in the preferred embodiments of the invention.

Examples of such units are illustrated diagrammatically in FIGS. 3(a)–3(c). The low pass filter F1 of FIG. 3(a) will permit transmission of signals up to approximately 10 KHz to allow for analog POTS service to the subscriber. Such a filter, for example, may include a load coil. The low pass filter F2 of FIG. 3(b) will permit a frequency pass range of up to 80 KHz, sufficient to service a digital subscriber line (DSL) such as provided for ISDN service. The low pass filter F3 of FIG. 3(c) will permit a frequency pass range up to the level required for HDSL and ADSL frequencies. The limit of 400 KHz shown permits HDSL service.

In operation, upon establishing the subscribed level of service, the appropriate low pass filter unit can be plugged into the subscriber line at the main distribution frame. Thus, if only standard POTS service has been allocated to the subscriber line, filter F1 will be inserted in the communication path so as not to permit ADSL transmission over the subscriber line. If a service upgrade is later desired, filter F1 readily can be replaced by the appropriate plug-in F3 filter.

Figure 4:
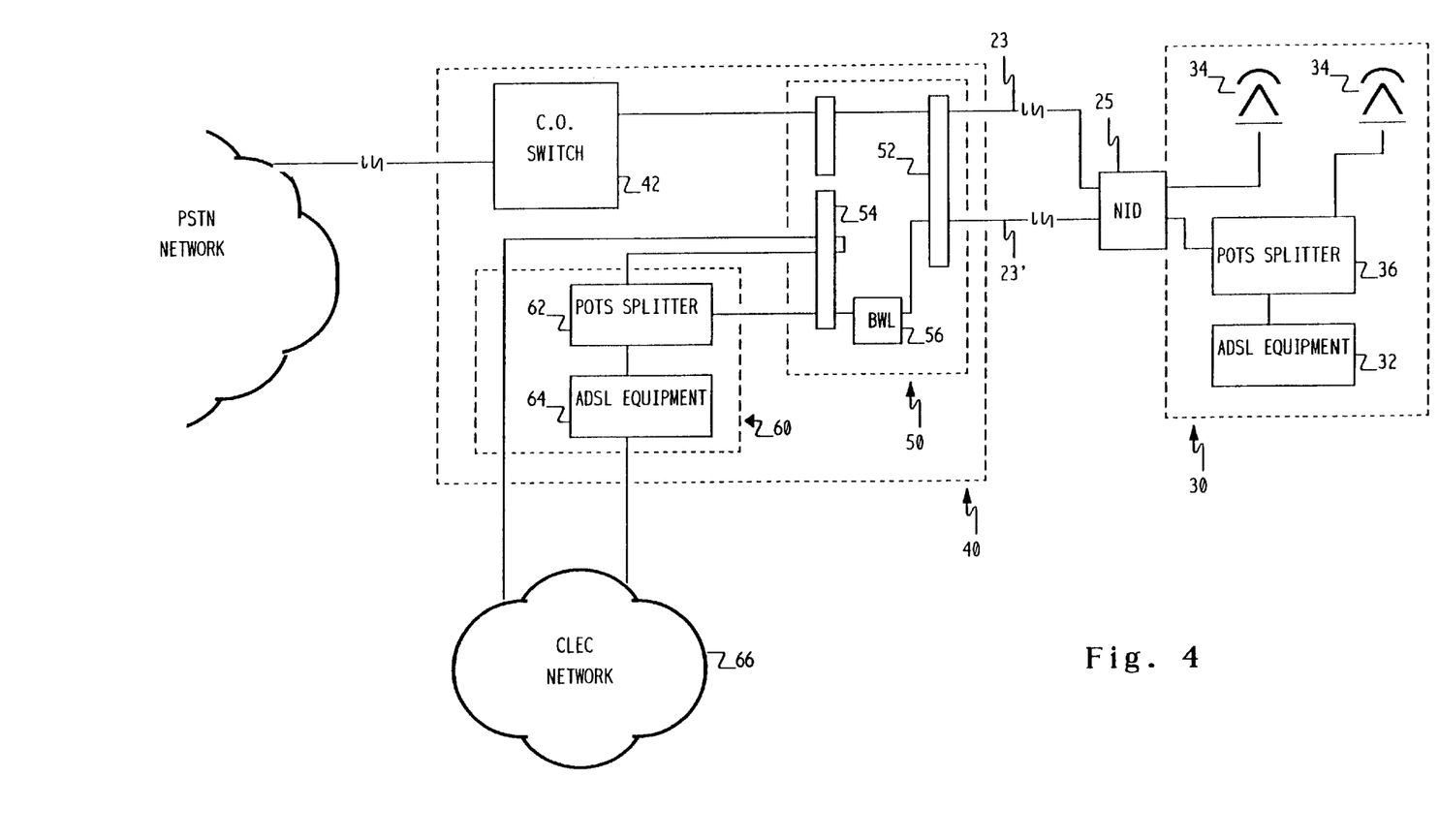
FIG. 4 is a simplified diagram of an embodiment of the present invention in which a customer premises is provided with two subscriber lines, one line receiving POTS service from an incumbent LEC, the other line leased to a competing service carrier capable of providing both POTS service and ADSL service over the same loop.

In the embodiment of FIG. 4, customer premises 30 is provided with two subscriber lines, line 23 receiving POTS service from the incumbent LEC via central office 40, line 23' leased to a CLEC capable of providing both POTS service and ADSL service over the same loop. Each of lines 23 and 23' are assigned individual telephone numbers. Line 23 is connected in conventional manner to the main distribution frame and to the switch 42 at the central office. Line 23' is arranged to be served in a manner similar to the embodiment shown in FIG. 2. The band limiter 56 may comprise the appropriate low pass filter, as described with respect to FIG. 3, that corresponds to the service subscribed from the CLEC and leased from the incumbent LEC. If the leased service is not within the ADSL standard, the appropriate band width limiter will prevent provision of ADSL service.

Line 23' alternatively may be leased only for data network services, the incumbent LEC exclusively providing POTS services over line 23. To ensure that services are conform to this arrangement, a frequency band pass limiter having filter band pass characteristics that match only the subscribed data network service(s) will be used for BWL 56. In the illustrated example, only ADSL signals will passed over the subscriber line 23'. In this example, the CLEC POTS splitter and analog loop connection through the upper portion of frame 54 would not be provided at the central office 40.

Figure 5:
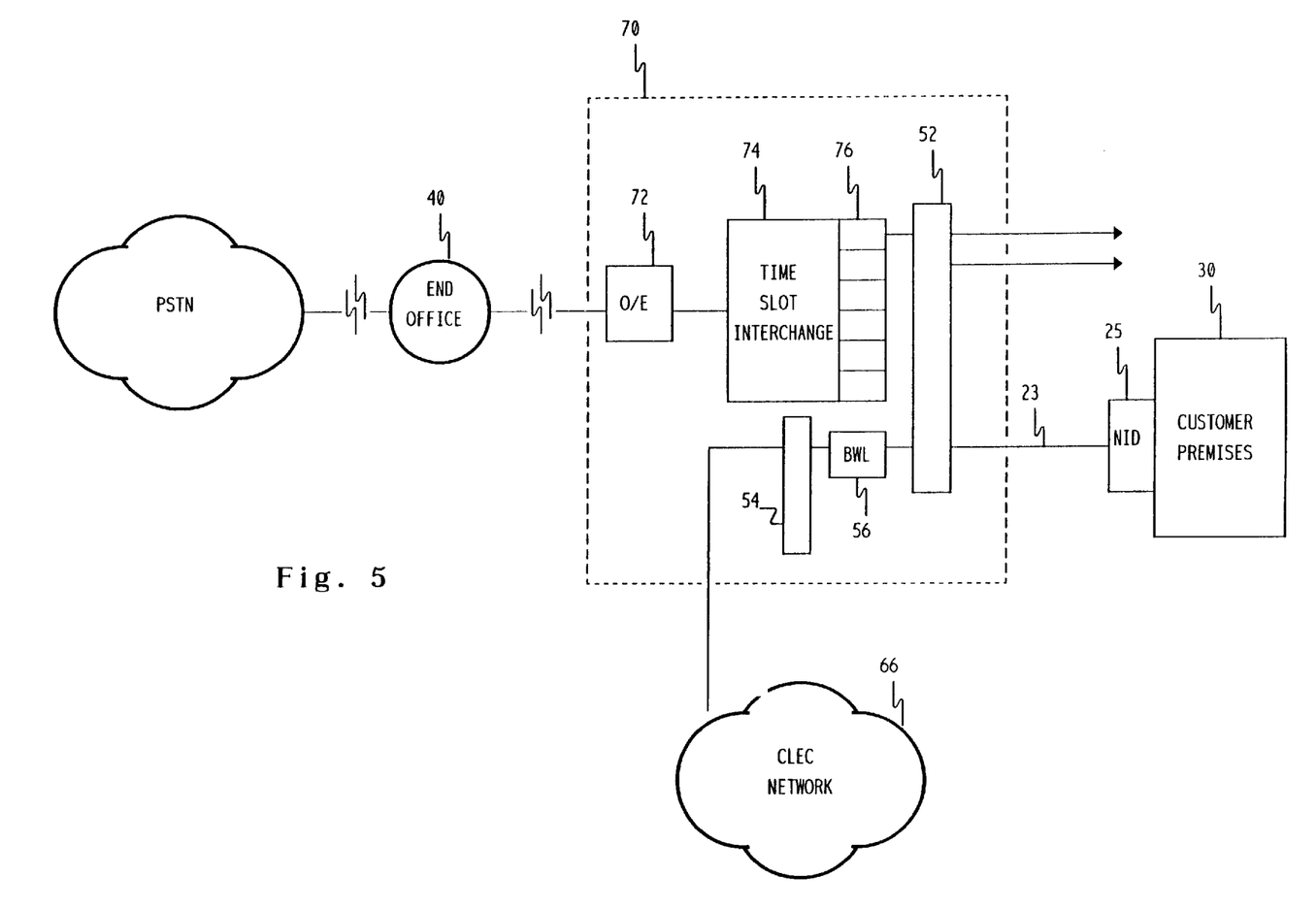
FIG. 5 is a simplified block diagram illustrative of an embodiment according to the present invention in which a CLEC leased subscriber line is connected to an incumbent LEC distribution frame located at a site remote from the central office.

FIG. 5 is a simplified block diagram of an embodiment of the invention in which subscriber lines are connected to an incumbent LEC distribution frame located at a site remote 70 from the central office. As an example of this embodiment, the LEC end office may be equipped with fiber optic transmission capability, whereby optic fiber communication lines extend from the end office to a controlled environmental vault (CEV) 70 at the remote location. O/E interface converts optical transmission signals received from the end office to electrical transmission signals which are fed to time slot interchange 74. Line cards 76 separate signals to be routed to the appropriate subscriber lines via distribution frame 52. As in the previous embodiments, subscriber line 23 is leased to a CLEC, which may have a twisted pair connection from the CLEC network to distribution frame 54 in the CEV. Band width limiter 56, connected between distribution frame portions 54 and 52, is selected to provide the appropriate frequency pass band that corresponds to the subscribed service.

Figure 6:
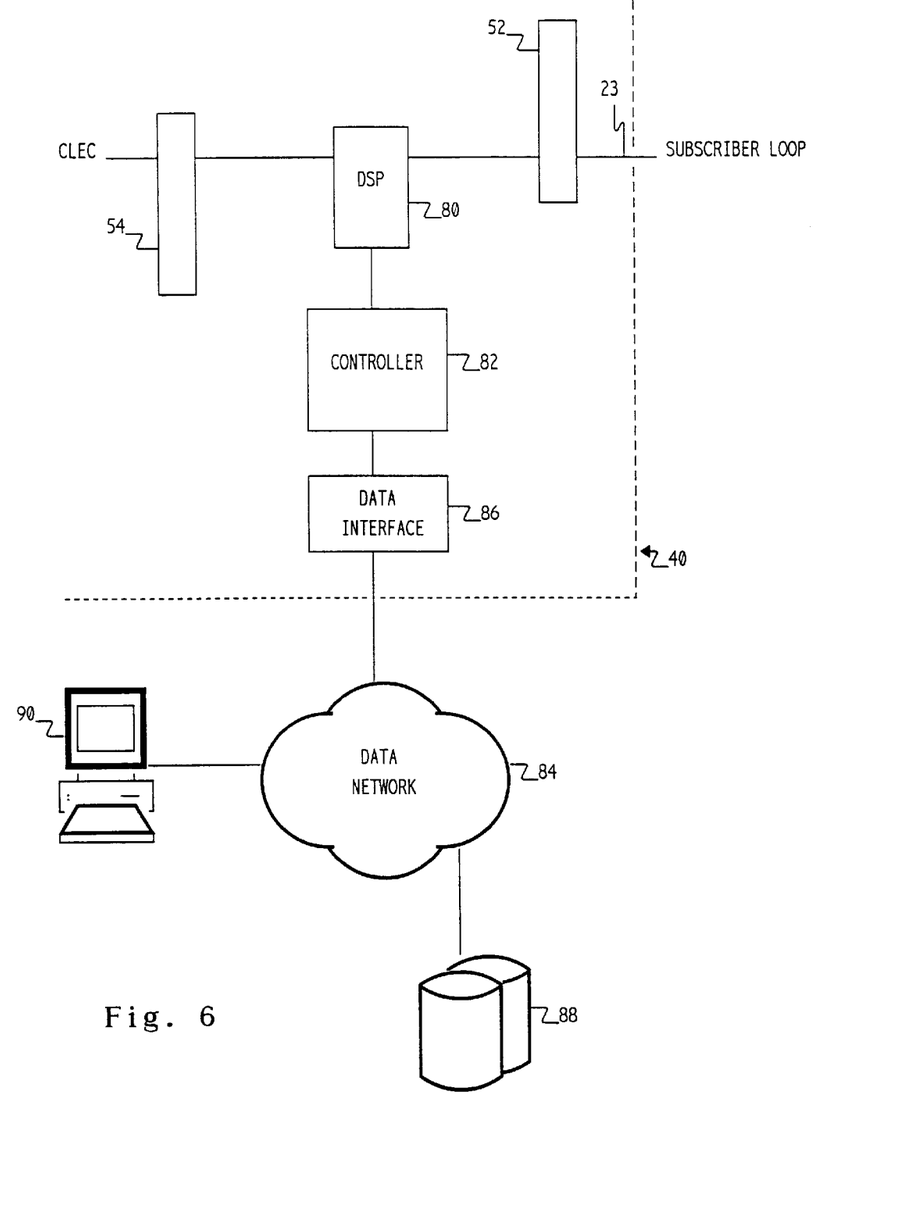
FIG. 6 is a simplified block diagram of another embodiment according to the present invention providing automated selection of appropriate band width limiting characteristics for subscriber loop service control.

FIG. 6 is a simplified block diagram illustrative of an automated arrangement for selection of appropriate filter band width characteristics for the subscribed loop service. This embodiment may contain the same elements as the embodiments of FIGS. 2 and 4 with further modification and additions exemplified in the drawing figure. The leased subscriber line 23 is part of a communication path that includes, in the ILEC central office, distribution frame portions 52 and 54 and digital signal processor 80, and connection to the CLEC network. DSP 80 is connected to, and under the control of, controller 82, the latter including microprocessor capability or the like. Unlike the passive filters, the digital signal processor is programmable to effect selectively from a plurality of filter band pass characteristics having pass ranges matched to the respective services that may be leased by the LEC. The digital signal processor thus operates as an active filter that will attenuate signals outside of the selected frequency range. By way of example only, a controller and attenuator such as the commercially available Counseltronics DLS 400 can be utilized. Controller 80 is connected to a data network 84 through an appropriate data interface 86. Network 84 may comprise an ILEC private data network through which communication among the various system components, such as central offices, data base storage 88 and control terminal 90 can occur.

In operation, the level of subscribed service is agreed upon by the user and the CLEC who leases the subscriber line from the ILEC. The ILEC will enter data descriptive of the leased service for the subscriber line, as well as any other subscriber lines, through a terminal such as unit 90 for storage via the data network 84 in a database 88. The controller 82 at the central office receives the subscriber line service information via the data network either from the terminal 90 or the database source. In response, the controller runs the program for selection of the appropriate filter characteristics at DSP 80.

Figure 7:
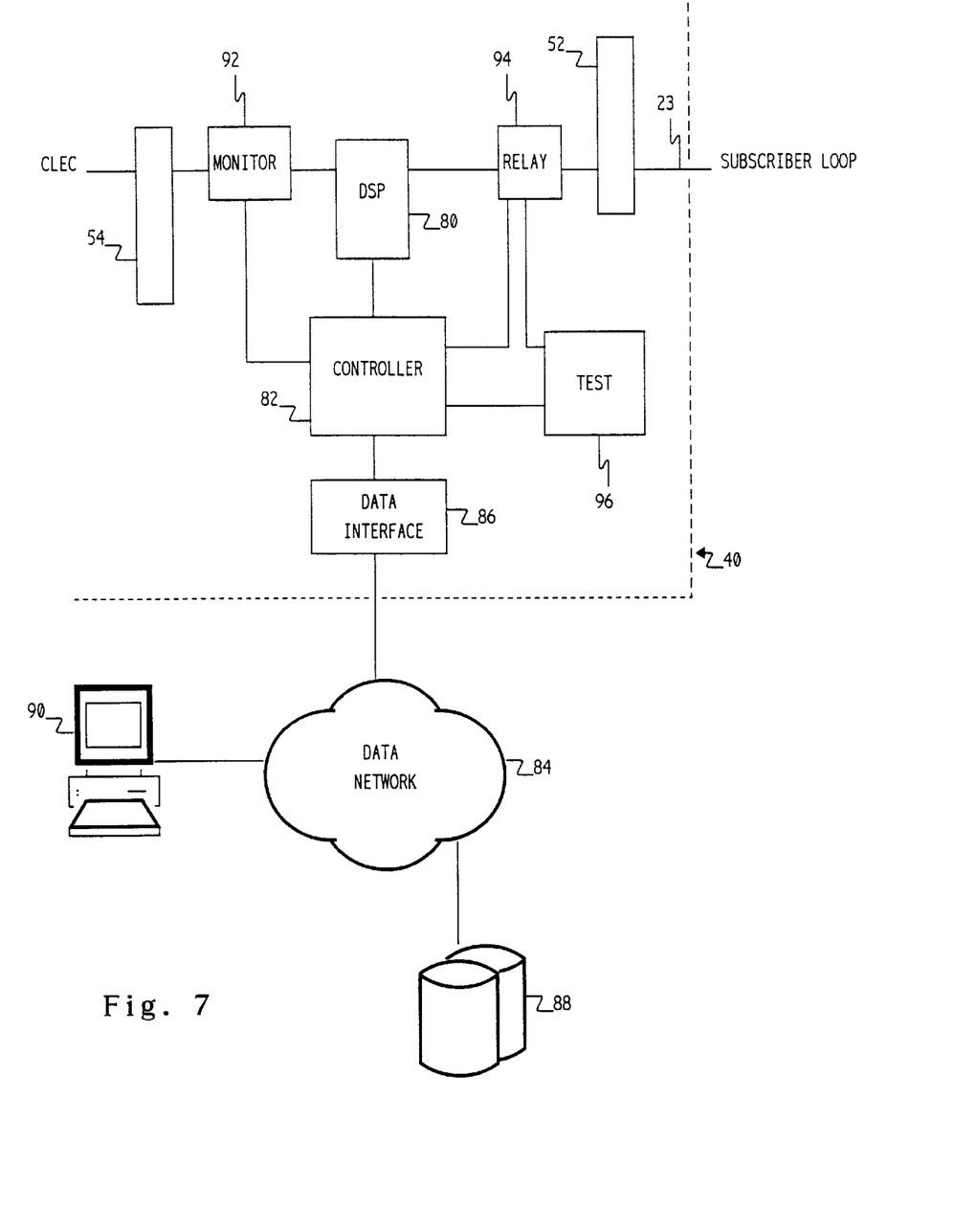
FIG. 7 is a simplified block diagram of an embodiment of the present invention similar to the arrangement of FIG. 6 but further modified to provide monitoring and testing feedback.

The embodiment of FIG. 7 provides monitoring and testing features in the arrangement of FIG. 6, which has been modified in the following respects. Connected in the subscriber communication path between frame portion 54 and DSP 80 is monitor 92, which is shown linked to controller 82 by a single connection line. This line represents one or more data paths between the two units by which control signals are sent from the controller to the monitor and return signals are sent from the monitor to the controller. Connected in the subscriber communication path between DSP 80 and frame portion 52 is relay unit 94, which is also connected to test unit 96 and controller 82. Monitor 92 may be similar to monitors more fully described in the aforementioned co-pending applications Ser. Nos. 08/598,768 and 08/598,772. Test unit 96 may comprise mechanized loop test equipment common to central office switching systems.

In operation, monitor 92 detects power distribution over the frequency spectrum for signals received from the CLEC prior to attenuation at DSP 80. Predetermined power thresholds may be set to indicate use of frequency range transmission. Identification of the frequency pass band range selected by the controller for the programmed DSP is sent by the controller to the monitor. If the power threshold is exceeded for frequencies outside of the frequency pass band range set for the DSP, detection of this event is made by the monitor. The monitor then generates a signal, which is sent back to the controller. This signal may be considered to be an alarm signal indicating improper transmission. The controller can then initiate appropriate messaging via the data network back to the terminal 90 or other appropriate ILEC equipment to deal with the situation. If the ILEC has the capacity to carry the upgraded service, station 90 can interact with the CLEC through data communication to determine whether the upgraded service is to be authorized. For example, a user who has subscribed to POTS service through the CLEC may install ADSL equipment or the like and attempt to use ADSL service without taking cognizance of the level of subscribed service. The arrangement of FIG. 7 not only proactively blocks this service by filtering out the higher frequency signals but permits, through the monitoring feature, a renegotiated upgrade of the level of service. If the service is to be upgraded, station 90 transmits the appropriate information over the data network 84 to controller 82, which then selects the appropriate filter frequency pass band range to be programmed into DSP 80.

Relay 94 is controlled by controller 82 to be selectively actuated to connect the unbundled leased subscriber loop 23 to the test unit to perform measurements of dc line parameters, such as voltage, resistance and capacitance measurements. While mechanized loop testing is commonplace, testing of unbundled leased lines has not heretofore been readily available to the ILEC. The test results are conveyed by the test unit to the controller, which can transmit test reports or test data through the data network 84 to the appropriate location in the CLEC system.

In this disclosure there is shown and described only the preferred embodiments of the invention and but a few examples of its versatility. It is to be understood that the invention is capable of use in various other combinations and environments and is capable of changes or modifications within the scope of the inventive concept as expressed herein. For example, while the embodiments of FIGS. 6 and 7 are set in the context of the CLEC switching office, the monitoring and testing features can be installed at a remote site such as described for the embodiment of FIG. 5 without departing from the concepts of this invention.

What is claimed is:

1. For a telephone network switching office capable of supplying plain old telephone service (POTS) as well as high speed data communication for an incumbent local exchange carrier (ILEC), apparatus comprising:

a first distribution frame portion connected to a subscriber loop communication line;

a second distribution frame portion connected to a competing local exchange carrier (CLEC); and a variable frequency bandpass filter connected between said first distribution frame portion and said second distribution frame portion in a communication path that includes said subscriber loop communication line and said CLEC, said filter settable to a frequency band that corresponds to a subscribed loop service.

2. Apparatus as recited in claim 1, wherein said apparatus is located at said switching office.

3. Apparatus as recited in claim 1, wherein said apparatus is located at a location remote from said switching office.

4. Apparatus as recited in claim 1, wherein said filter is programmable, and further comprising a controller responsive to externally supplied data for programming the frequency band of said filter.

5. Apparatus as recited in claim 4, wherein said controller is connected to a data network linked to an external database in which information identifying said subscribed loop service is stored, said externally supplied data comprising the identifying information received by said controller via said data network.

6. Apparatus as recited in claim 4, said variable frequency bandpass filter comprises a digital signal processor for attenuating signals having frequencies outside said frequency band.

7. Apparatus as recited in claim 1, wherein said subscribed loop service is POTS and the frequency passband range of the filter is set for passing only analog telephone service signals.

8. Apparatus as recited in claim 1, wherein said subscribed loop service is Integrated Services Digital Network (ISDN) service and the frequency passband range of the filter is set for passing only telephone service signals within a frequency range prescribed for ISDN.

9. Apparatus as recited in claim 1, wherein said subscribed service is High bit rate Digital Subscriber Line (HDSL) service and the frequency passband range of the filter is set for a lowpass filter characteristic having a passband range for telephone service signals in frequency up to and including an HDSL limit.

10. Apparatus as recited in claim 1, wherein said subscribed service is Asymmetric Digital Subscriber Line (ADSL) service and the frequency passband range of the filter is set for a lowpass filter characteristic having a passband range for telephone service signals in frequency up to and including an ADSL limit.

11. Apparatus as recited in claim 1, wherein said subscribed service is a data service and the frequency passband range of the filter is set for a notch filter characteristic having a passband range only for telephone service signals in frequencies within the frequency range of the subscribed data service, to the exclusion of the POTS analog telephone service signal range.

12. Apparatus as recited in claim 1, further comprising a monitor, connected in said communication path at a point between said variable frequency bandpass filter and said second distribution frame portion, for detecting power distribution throughout a wide frequency spectrum of signals transmitted in said path from said CLEC.

13. Apparatus as recited in claim 12, wherein said monitor is connected to said controller whereby, in response to detection of a signal having a power level in excess of a predetermined threshold at a frequency outside the set frequency band of said filter, a signal is passed from said monitor to said controller.

14. Apparatus as recited in claim 12, further comprising a test device connectable to said communication path at either side of said filter for measuring parameters of the subscriber loop.

15. In a telephone network having a switching office capable of supplying plain old telephone service (POTS) as well as high speed data communication for an incumbent local exchange carrier (ILEC), said switching office having a first distribution frame portion connected to a subscriber loop communication line and a second distribution frame portion connected to a competing local exchange carrier (CLEC) to establish a communication path that includes said subscriber loop communication line and said CLEC, a method for limiting signals transmitted over said communication path comprising the steps of:

establishing a subscribed level of service for said subscriber loop communication line; and filtering the frequency of signals passed between said first distribution frame portion and said second distribution frame portion to a frequency passband range that corresponds to said subscribed level of service.

16. A method as recited in claim 15, wherein said establishing step comprises:

accessing, via a data network, a remote database at which subscriber service levels are stored to obtain subscriber service information for said subscriber loop communication line.

17. A method as recited in claim 16, wherein said filtering step comprises setting said frequency passband range in response to the information obtained in said accessing step.

18. A method as recited in claim 17, further comprising the steps of:

monitoring signals applied to said communication path from said CLEC; and generating an alarm signal in response to detection in said monitoring step of a signal having a power level in excess of a predetermined threshold at a frequency outside said frequency band range set in said setting step.

19. A method as recited in claim 18, further comprising the steps of:

in response to said alarm signal generated in said generating step, determining whether said subscribed level of service established in said establishing step should be changed to a new level of service; and in response to a positive determination in said determining step, setting a new frequency passband range, corresponding to said new level of service, for filtering the frequency of signals passed in said communication path.

20. A method as recited in claim 15, further comprising measuring parameters of the subscriber loop communication line.

* * * * *